United States Patent
Kendrekar et al.

(10) Patent No.: US 12,282,410 B2
(45) Date of Patent: Apr. 22, 2025

(54) PROACTIVE PERFORMANCE SUPERVISION OF MULTITENANT CLOUD DB USING HIERARCHICAL TRIAGE AND COMPARATIVE APPROACH MAINTAINING THE DATA PRIVACY AND ISOLATION

(71) Applicant: Oracle International Corporation, Redwood Shores, CA (US)

(72) Inventors: Amit Kendrekar, Aurangabad (IN); Harikishan Sivaramakrishnan, Karnataka (IN); Nagarajan Muthukrishnan, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 32 days.

(21) Appl. No.: 18/471,521

(22) Filed: Sep. 21, 2023

(65) Prior Publication Data

US 2025/0103460 A1    Mar. 27, 2025

(51) Int. Cl.
- *G06F 15/173*    (2006.01)
- *G06F 11/34*    (2006.01)
- *G06F 16/28*    (2019.01)

(52) U.S. Cl.
CPC ........ *G06F 11/3495* (2013.01); *G06F 16/284* (2019.01)

(58) Field of Classification Search
CPC ............................ G06F 11/3495; G06F 16/284
See application file for complete search history.

(56) References Cited

U.S. PATENT DOCUMENTS

| 2006/0242288 | A1 | 10/2006 | Masurkar |
| 2009/0193298 | A1 | 7/2009 | Mukherjee |
| 2011/0314138 | A1 | 12/2011 | Kobayashi et al. |

(Continued)

OTHER PUBLICATIONS

Diagnosing Performance Problems Using ADDM Oracle ® Database 2 Day D&A 11g Release 1 (11.1) downloaded from the Internet Jun. 13, 2011, 5 pages.

(Continued)

*Primary Examiner* — Joseph R Maniwang
(74) *Attorney, Agent, or Firm* — Hickman Becker Bingham Ledesma LLP; Brian Miller (57) ABSTRACT

Herein are hierarchical and non-intrusive techniques to detect and diagnose incidental contention between database tenants. In an embodiment, a computer hosts a database server that operates a container database. The database server monitors level one performance metrics that characterize the performance of at least a first pluggable database (PDB) in the container database. The database server detects, in the level one performance metrics, a performance degradation of the first PDB. Responsively, the database server dynamically configures collection of level two performance metrics that characterize the performance of at least the first PDB and a second PDB in the container database. The database server detects, in the level two performance metrics, that the performance degradation is caused by the second PDB. The database server generates an alert that identifies the second PDB. The alert contains a particular metric of the level two performance metrics, and the particular metric characterizes the performance of the second PDB.

20 Claims, 4 Drawing Sheets

(56) References Cited

U.S. PATENT DOCUMENTS

2017/0161131 A1* 6/2017 Noll ................... G06F 11/3034
2021/0081355 A1* 3/2021 Bottger ................. H04L 67/10
2022/0382721 A1* 12/2022 Muthukrishnan ... H04L 67/1001
2024/0012795 A1* 1/2024 Kandasamy .......... G06F 16/217

OTHER PUBLICATIONS

Automatic Workload Repository (AWR) in Oracle Database 10g Database Monitoring downloaded from the Internet, date unknown, 3 pages.
Automatic Database Diagnostic Monitor (ADDM) in Oracle Database 10g Database Monitoring downloaded from the Internet, date unknown, 3 pages.

* cited by examiner

PROACTIVE PERFORMANCE SUPERVISION OF MULTITENANT CLOUD DB USING HIERARCHICAL TRIAGE AND COMPARATIVE APPROACH MAINTAINING THE DATA PRIVACY AND ISOLATION

FIELD OF THE DISCLOSURE

This disclosure relates to multitenant database quality of service. Presented herein are hierarchical and non-intrusive techniques to detect and diagnose incidental contention between two database tenants.

BACKGROUND

A container database management system (DBMS) is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique identifier and name. The root database and every pluggable database (PDB) is considered a container. A container DBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a container DBMS by establishing a database session for a PDB. Techniques and mechanisms of a multitenant database architecture composed of a CDB, root database, PDBs, database dictionaries, and database sessions are presented later herein, with their arrangement and internals depicted in related U.S. Pat. No. 10,942,945.

The container DBMS stores the system metadata required to manage all PDBs within the container DBMS. In some implementations, the root database of a container DBMS stores data that is common across the PDBs of the container DBMS, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared database resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

A CDB enables amortization of computer resources such as operating system resources. Operating system resources may be accessed and managed by an operating system. Operating system resources include processes, memory, network resources, filesystems, subdirectories therein, and central processing units (CPUs). The computer resources required to provision and host a PDB are in effect amortized between the multiple PDBs within a CDB. The computer resources needed per PDB are thereby reduced. In a container DBMS, database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDBs dedicated database dictionary. A container DBMS may implement various levels of isolation. While database objects may be isolated between database sessions of PDBs, various computing resources may be shared across database sessions of PDBs. Hosting multiple PDBs on the same database server thus allows the computing resources of database servers or instances to be shared between multiple PDBs.

Using a multitenant architecture, a server within a single operating system instance is used to run multiple CDBs and PDBs. By using a single operating system instance, resources managed by the operating system may be shared, including computing resources, filesystems, and network resources. However, sharing such resources between multiple tenants may sometimes have suboptimal performance.

In autonomous cloud environments, hundreds or thousands of tenant databases can be consolidated as pluggable databases in isolated container databases that are hosted in compute appliances. These multitenant environments provide execution environments for thousands of clients within the consolidated databases. In a comanaged or fully managed database cloud service, there are multiple hierarchical stacks and microservices, at times used by different entities, such as a cloud customer. For example, a database computer may contain an implementation stack that is a sequence of infrastructure layers such as a pluggable database layer, a container database layer, a database server layer, a virtual machine layer, an operating system layer, and a hardware layer. Each of these layers can have a unique problem, which may or may not be interrelated, but collectively could contribute to service degradation or outage. Different implementation stack concerns such as performance, reliability, and scalability are often interdependent on these different parts of the stack.

There is a need to monitor implementation layers proactively and try to co-relate the symptoms, in order to identify and anticipate issues objectively, so that the service level agreements (SLAs) may be met. This requires a methodology to systematically detect the problem, collect the relevant evidence, analyze the artifacts and cohesively put together an event or an incident, and report the same to the relevant layer owner such as a database administrator (DBA), a system administrator, or a hardware technician. For example, a poorly performing hard drive may need replacement and cause a performance degradation in the pluggable database layer or the virtual machine layer. Preliminary diagnosis, such as selecting which infrastructure layer to inspect and how, would ideally be done by the service monitoring architecture without compromising the security and confidentiality aspects from the customer perspective, e.g. the customer private data.

The following are challenges with database stack monitoring that generally arise from a lack of visibility into the implementation stack as a whole. Visibility by an administrator or subsystem may be limited to a particular infrastructure layer. Visibility is further limited by natural privacy concerns of one or multiple tenants in a same container database. A tenant owns a pluggable database but might not own the container database that hosts the pluggable database. The tenant cannot observe infrastructure layers below the pluggable database layer, such as the container database layer, and cannot observer pluggable databases of other tenants in the container database. Thus, diagnostic visibility is limited by security boundaries between the infrastructure layers of the implementation stack and between collocated databases of different tenants.

Some implications of those security limits imposed on tenants are as follows. It may be infeasible to correlate infrastructure and container database metrics with pluggable database metrics. Tenants cannot identify performance issues that are due to infrastructure or cumulative issues in the container database. There may be gaps in a tenant's or administrator's ability to react to (e.g. diagnose or solve) a detected problem. For example, the route to make an ad-hoc change may be circuitous and encompass multiple stakeholders.

The following are shortcomings of current monitoring tools. There is no in-place data processing. Current tools need to ship data to external stores, which causes delay in analysis and also misses the opportunity to check real time data from database (DB) views. Operating system (OS) and DB metrics cannot be corelated, which prevents corelating symptoms between user domain, OS, and DB to identify cross layer impact of a problem. The state of the art is intrusive and has high latency. There is no capability to capture and maintain a baseline of multitenant autonomous cloud database key performance metrics to detect, for example, a trend.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To preserve multitenant database quality of service, herein are hierarchical and non-intrusive techniques that detect and diagnose incidental contention between two database tenants. Herein is a streamlined database monitoring framework, which collects, analyzes, correlates and compares crucial database performance metrics at a systemic level. Events and observations are generated and analyzed in reaction to abnormal behavior of a database.

Designs herein may treat a pluggable database as opaque (i.e. a black box), thereby generating performance observations from outside of the pluggable database without compromising data privacy and security. Early detection of performance degradation symptoms, along with automatically proposed possible resolutions, reduces overall troubleshooting and triaging time. Continuously evolving database product and service capabilities require an agile operation response to protect an enterprise service. This flexible framework, referred to herein as hierarchal performance monitoring (HPM), provides and facilitates knowledge-based analyzers whose instrumentation can be dynamically enabled or injected and disabled at different architectural and infrastructural levels to meet performance requirements.

Security and data privacy may be crucial for enterprise deployments. By design, in-place data collection and analysis in this framework neither access nor expose private data. In an embodiment, operating system (OS) and database (DB) metrics are integrated for comprehensive analytics that generate precise diagnostic information to narrow down the problem areas, which helps to resolve the problem quickly. An embodiment of HPM may have the following sequence of diagnostic phases 1-2 with respective goals and sub-phases.

Diagnostic phase 1 diagnosis may be limited to level one analysis and observations, such as with five distinct structured query language (SQL) queries to get a macro view of the DB, infrastructure input/output (I/O) and central processing unit (CPU) usage for an implementation stack that HPM treats as a sequence of infrastructure layers such as a pluggable database layer, a container database layer, a database server layer, a virtual machine layer, an operating system layer, and a hardware layer.

Diagnostic phase 2 is based on level one findings and, accordingly, level two and level three diagnostics and collections will be triggered to provide a coordinated analysis and observations. Diagnostic phase 2 may have a sequence of two sub-phases. A first sub-phase may execute focused queries to drill down into recorded metrics of a particular infrastructure layer or database. A second sub-phase has level two and level three analysis that may be extensible as discussed herein.

An embodiment may have various thresholds and trends for metrics that characterize the individual or aggregate performance of multiple pluggable databases in a container database. Any performance metric threshold herein may be proactive, which means that the threshold itself is lowered by some safety margin so that the threshold is exceeded before an actual violation of a quality of service (QOS) occurs. In other words, techniques herein can detect, diagnose, and remedy a performance degradation before any of the database tenants could notice the performance degradation. With this proactive approach, a public cloud may optimally balance load and, with sufficient capacity planning, essentially always provide guaranteed QoS.

In an embodiment, a (e.g. physical or virtual) computer hosts a database server that operates a container database. The database server monitors level one performance metrics that characterize the performance of at least a first pluggable database in the container database. The database server detects, in the level one performance metrics, a performance degradation of the first pluggable database. Responsively, the database server dynamically configures collection of level two performance metrics that characterize the performance of at least the first pluggable database and a second pluggable database in the container database. The database server detects, in the level two performance metrics, that the performance degradation is caused by the second pluggable database. The database server generates an alert that identifies the second pluggable database. The alert contains a particular metric of the level two performance metrics, and the particular metric characterizes the performance of the second pluggable database.

As discussed herein, a generated alert may identify another pluggable database as a root cause of the performance degradation and identifies or contains a performance metric of the causal pluggable database. This approach, from performance degradation detection to detailed alert generation, is faster and more reliable than other expert diagnostic approaches. The generated alert, including or not an automatically proposed recommended adjustment, enables personnel to remedy the root cause, as identified in the alert, in less time than with other expert diagnostic approaches. Thus, the detected performance degradation can be eliminated faster and the performance of the database server increased (i.e. back to normal) sooner. In that way, this approach increases the speed, throughput, and reliability of the database server and improves (i.e. decreases) the latency of the database server. The performance of the database server is improved by the following automation.

1.0 Example Database Server

Figure 1:
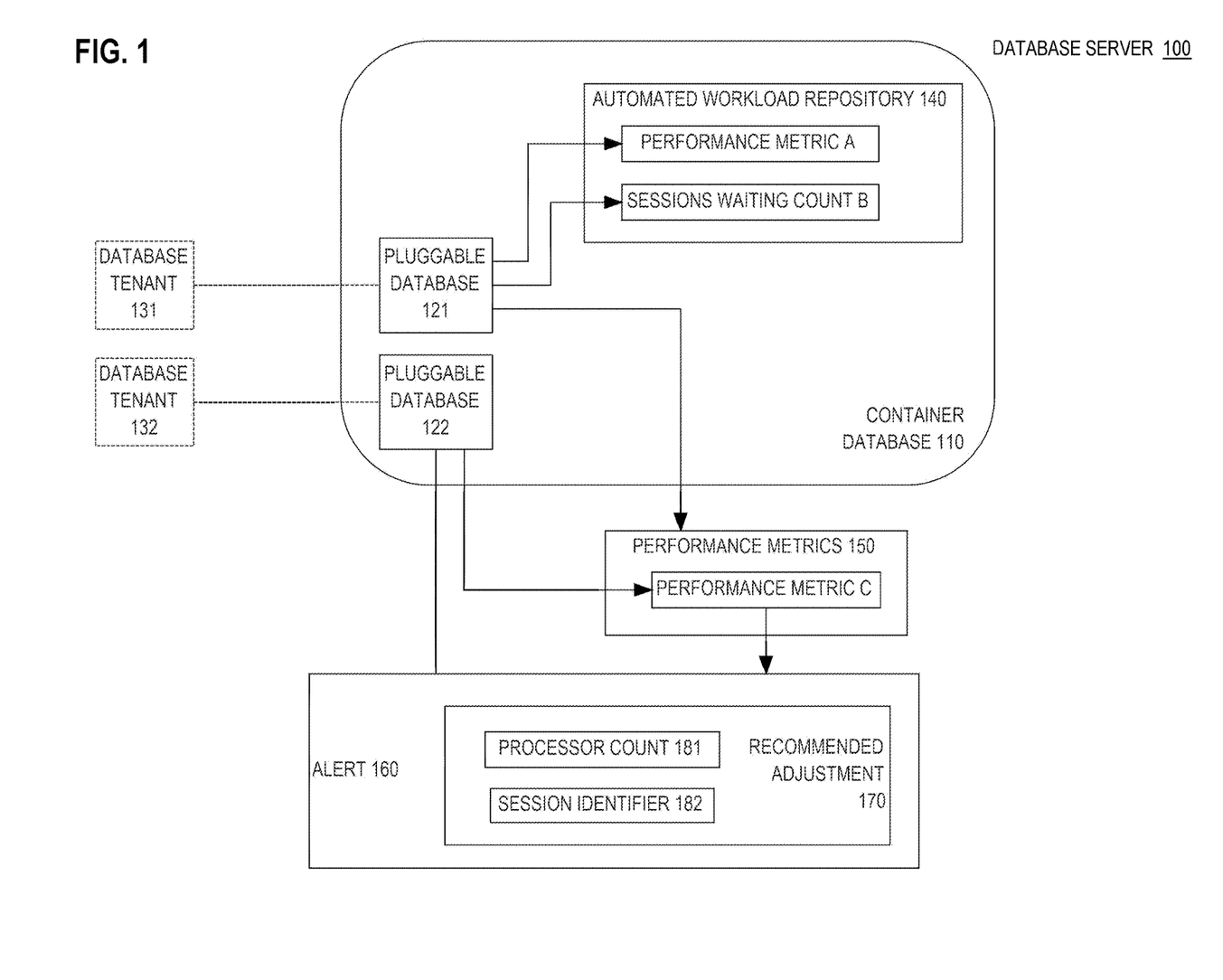
FIG. 1 is a block diagram that depicts an example database server that preserves quality of service in a multitenant container database by using hierarchical and non-intrusive techniques to detect and diagnose incidental contention between database tenants.

FIG. 1 is a block diagram that depicts example database server 100 that implements hierarchal performance monitoring (HPM) to preserve quality of service in multitenant container database 110 by using hierarchical and non-intrusive techniques to detect and diagnose incidental contention between database tenants 131-132. Database server 100 may be a software program that may operate as a container database management system (DBMS) and as a relational DBMS to administer and operate multiple databases on behalf of database tenants 131-132. For example, database server 100 may receive and execute database statements from database clients, such a structured query language (SQL) statements. Database server 100 is hosted on a computer that may be a rack server such as a blade, a mainframe, a virtual machine, or other computing device.

1.1 Database Tenant and Pluggable and Container Databases

In an embodiment, database server 100 is part of a public cloud that has many tenants such as database tenants 131-132 that are shown with dashed outlines to indicate that database tenants 131-132 may be external to database server 100. Representing one or more users, a tenant is a client entity that may be or have one or more of a database user account, an operating system (OS) user account, or a cloud user account. For example, database tenant 131 may represent, or be owned or controlled by, a distinct independent enterprise that is a customer of the public cloud. Each database tenant may operate or be associated with a respective distinct computer program that is a database client that may contain a database driver that may, for example, use open database connectivity (ODBC) to connect to database server 100 to initiate a database session through which the database client may submit database statements for execution by database server 100. In various embodiments, a database client is or is not hosted on a same computer as database server 100. For example, communication between the database client and database server 100 may entail transport mechanisms such as a communication network, an internetwork, or inter-process communication (IPC). In various embodiments, multiple database servers are or are not hosted by a same computer or a same virtual machine. For example, a public cloud embodiment may host each database server in a respective distinct virtual machine that can be dynamically upscaled vertically or horizontally (e.g. elastic).

Each tenant may own, control, or operate its own mutually exclusive set of pluggable databases. A pluggable database has at most one tenant. For example, database tenant 132 is the only tenant of pluggable database 122. A multitenant container database may contain multiple pluggable databases with different respective tenants. For example, contained in container database 110 are pluggable databases 121-122 that have different respective database tenants 131-132. In an embodiment, database tenant 132 can administer pluggable database 122 but not databases 110 and 121 and not database server 100. Implementation and operation techniques for container databases and pluggable databases are presented elsewhere herein. A database tenant may have multiple pluggable databases in a same or different container databases of a same or different database server. A database tenant may have one or more database user accounts, each with one or more database sessions in a same or multiple databases. In an embodiment, a pluggable database of a database tenant may sometimes autonomously operate in the background with or without a database session of the database tenant.

1.2 Proactive Thresholds for Performance Metrics that Fluctuate in Dynamic Topology By design, pluggable databases and database sessions are always kept logically isolated by database tenant. For example, database tenant 131 can discover, inspect, and modify pluggable database 121 but not 122. A goal of that design is that operation of pluggable database 122, either autonomously or directly by database tenant 132, should be unable to accidentally degrade the quality of service of other pluggable database 121 of other database tenant 131. Such accidental interference between database tenants 131-132 may be especially problematic in a public cloud that operates as an elastic data grid under unpredictable load in which many pluggable databases are dynamically horizontally scaled into additional container databases or dynamically vertically scaled by relocation between container databases. Topologic dynamism may arise from upscaling, downscaling, maintenance such as rolling upgrades, and daily or weekly cyclic demand that is scheduled or unscheduled. Such topologic dynamism may make root cause identification of performance degradation difficult because the mix of database tenants of container database 110 may fluctuate. In an extreme example such as an elastic public cloud, data grid topology may, more or less continuously during ordinary operation, automatically change faster than a human administrator can diagnose a performance degradation.

In the shown example, database server 100 automatically collects and monitors multiple performance metrics that characterize performance (e.g. quality of service) of one or more pluggable databases, including a particular pluggable database in container database 110. Individually or by aggregation, database server 100 collects and monitors performance metrics for all pluggable databases 121-122 in container database 110. For example for pluggable database 121, database server 100 continuously or periodically collects and monitors performance metrics A-B. For example, sessions waiting count B measures a count of database sessions of pluggable database 121 that recently or currently are waiting (i.e. blocked or suspended) on a needed resource such as a processor core or a coordination lock. For example, database server 100 may automatically detect a performance degradation of pluggable database 121 by detecting that sessions waiting count B exceeds a predefined threshold such as a percentage or fraction of all of pluggable database 121's database sessions or an absolute count. In various embodiments, sessions waiting count B may: a) continuously measure how many database sessions are currently waiting or b) periodically measure a total or average count of database sessions that waited during a recent time interval.

Any performance metric threshold herein may be proactive, which means that the threshold itself is lowered by some safety margin so that the threshold is likely exceeded before an actual violation of a quality of service (QOS) occurs. In other words, techniques herein can detect, diagnose, and remedy a performance degradation before either of database tenants 131-132 could notice the performance degradation. With this proactive approach, a public cloud may optimally balance load and, with sufficient capacity planning, essentially always provide guaranteed QoS.

1.3 Automated Workload Repository

In an embodiment, monitoring is performed at three levels of intensity. At the first level, performance is monitored at coarse granularity of performance metrics that requires less system overhead using metrics gathered periodically. If performance issues are detected in the lower level, monitoring is performed at higher levels, requiring more overhead but evaluating current or recent generated performance metrics. The higher levels identify specific issues with particular pluggable databases and provide information to users of those pluggable databases.

In an embodiment, repository performance metrics may be generated by database server 100. The repository is referred to herein as automated workload repository (AWR). Each pluggable database has its own AWS (PDB-AWR) and the container DBMS has an AWR at the root level (CDB-level AWR). A PDB-AWR is only accessible to administrators of it pluggable database and includes detailed performance metrics about database objects and pluggable database resources. For example, a PDB AWR metrics may identify performance metrics for specific queries and details about the queries. Example SQL queries are presented later herein.

A CDB AWR tracks performance metrics but in a way that protects the privacy of pluggable database. For example, a CDB AWR tracks performance metrics for specific queries but associates the queries with the metrics in a way that reveals no definition of a query itself. For a particular query, the metrics may be associate with a hashed identifier of the query. The hashed identifier is opaque and cannot be directly inspected to discover a definition of the identified query. The hashed identifier may have a numeric or textual representation that may be furnished to administrators of a PDB for use in monitoring and diagnosis so that they can query their respective PDB AWR for more details. An example diagnostic SQL query that may be invoked by presenting its hashed identifier to database server 100.

In an embodiment, information from AWR is accessed through views. "Snapshot views" provide access to metrics gathered periodically. Level 1 metrics are exposed in snapshot views. "Live views" provide access to metrics that represent the current workload of database server 100, container database 110, and pluggable databases 121-122.

1.4 Collection and Recordation of Telemetry

Discussed elsewhere herein is the root database of container database 110, which may contain automatic workload repository 140. In an embodiment, automatic workload repository 140 may contain many Oracle automatic workload repository (AWR) relational database tables such as SYS.WRH$_SYSTEM_EVENT and SYS.WRH$_EVENT_HISTOGRAM. In an embodiment, automatic workload repository 140 may contain many Oracle dynamic performance views such as SYS.AWR_PDB_SNAPSHOT, V$CONTAINERS, V$RSRC_PDB_METRIC, V$PROCESS, and V$SESSION.

Performance metrics A-B are recorded into automatic workload repository 140 so that collection of performance metrics A-B may be decoupled from analysis of performance metrics A-B. For example, database server 100 may monitor the health of pluggable database 121 by periodically querying automatic workload repository 140 to access performance metrics A-B. Automatic workload repository 140 may contain performance metrics of all pluggable databases 121-122 in container database 110. Pluggable databases 121-122 do not contain automatic workload repository 140. Database tenants 131-132 cannot directly modify automatic workload repository 140 and, depending on the embodiment, can or cannot read a particular portion or all of automatic workload repository 140.

Automatic workload repository 140 may contain multiple different relational tables and database views that can be relationally joined in a database query that any of components 100, 110, and the root database may generate and/or execute. For example, performance metric A may reside in a relational table, and sessions waiting count B may instead reside in a database view, or vice versa.

1.5 Level One Performance Metrics

Herein, performance metrics A-B, such as those stored in automatic workload repository 140, are referred to as level one metrics because they are always available to provide visibility into database performance for detection of performance degradation. Level one metrics may be special in some or all of the following ways:

- They have pervasive availability such that database server 100 can always spontaneously or periodically discover the current or recent health (i.e. performance) of any pluggable database in container database 110. In other words, no problem goes unnoticed by the automation herein.

- They have history such that each may be a timeseries whose periodicity and expiration depend on the embodiment. For example, history may consist of a latest week's repeated scalar measurement (e.g. temperature) that was taken every five minutes. In another example, history may consist of a latest scalar measurement and the previous scalar measurement. In another example, history may consist of a latest scalar measurement that may be more or less recent. In other words, a level one metric may be a scalar or a timeseries.

- History may facilitate trend detection and analysis. For example, performance metric A may be an average or other statistical measurement over the history, and may or may not be a moving average. If performance metric A instead consists of a timeseries of independent measurements (e.g. temperature), then database server 100 may calculate an average or other statistic (e.g. histogram) from a portion or entirety of the timeseries if needed.

- Measurement and recordation (e.g. into automatic workload repository 140) of level one metrics has low latency such that when only a few level one metrics are defined, this latency is negligible. However, there is a limit on how many level one metrics can be defined before this latency becomes counterproductive by causing a performance degradation, and this limit should be based on a maximum count of pluggable databases that container database 110 can possibly contain. In some embodiments, recordation does not entail input/output (I/O) such as network communication and disk writing. For example, automatic workload repository 140 may reside in random access memory (RAM).

Due to the limit on how many level one metrics A-B, database server 100 may detect a performance degradation of pluggable database 121 but may be more or less unable to identify a root cause by analyzing only level one metrics.

For demonstration, level one metrics A-B characterize the performance of pluggable database 121. In an embodiment, some individual level one metrics may instead characterize multiple pluggable databases in container database 110, such as pluggable databases of a same database tenant or all pluggable databases regardless of database tenant.

Herein, characterization of the performance of a particular pluggable database may be implemented by characterization of the performance of a set of multiple (e.g. all) pluggable databases that include the particular pluggable database. For example, an average query latency of all pluggable databases in container database 110 may be used for investigation or initial characterization of the performance of a particular pluggable database. Performance metrics at any performance metric level herein may contain aggregation statistics that are not intended to unambiguously characterize the particular pluggable database but, nonetheless, are used to identify the particular pluggable database as impacted or impactful of performance as discussed later herein. For demonstration, any performance metric may be presented as characterizing a particular pluggable database which, herein, means that the performance metric characterizes one or more pluggable databases, including the particular pluggable database. In some cases, a performance metric may characterize the performance of container database 110 or database server 100 as a whole, and that performance metric may be used herein to characterize the performance of a particular pluggable database. For example, a network packet loss measurement may characterize database server 100 as a whole, and that performance metric may be used to characterize the performance of any pluggable database in database server 100. Thus, any performance metric herein characterizing the performance of a particular pluggable database may, in many cases, be based on a measurement of the performance of a component other than the particular pluggable database, and that performance metric may be reused to characterize other individual pluggable databases. For example in embodiments not shown, performance metric A may be shared by pluggable databases 121-122, or each of pluggable databases 121-122 may have its own instance of performance metric A to directly and specifically characterize the respective distinct performances of pluggable databases 121-122 individually.

In an embodiment, many or most level one metrics individually characterize all pluggable databases in container database 110, and privacy is preserved because those level one metrics do not reveal database content nor application specific processing. Regardless of granularity of aggregation statistics, privacy is ensured by design as discussed later herein. For example, the following discussion demonstrates that identifying a current pluggable database may, in an embodiment, be a prerequisite to obtaining any metrics at any level. Also discussed later herein is an opaque design that prevents reverse engineering of the metrics interface itself.

1.6 Example SQL Query for Level One Performance Metrics

The following is an example SQL online analytical processing (OLAP) query to retrieve the current and previous (i.e. two) AWR snapshots to be compared to each other for trend analysis of level one performance metrics. In database server 100, this example SQL query may be identified and invoked by a unique hashed identifier as discussed earlier herein. This example SQL query contains an expression SYS CONTEXT ('USERENV', 'DBID') that evaluates to the current pluggable database, which is owned by the tenant issuing this example SQL query. Thus, a tenant that invokes this example SQL query only receives metrics and information of the current pluggable database that the tenant owns. By design, metrics of other tenants are inaccessible.

```
WITH
end_snap AS
(SELECT MAX(s.snap_id) as snap_id ,
    MAX(s.END_INTERVAL_TIME_TZ AT TIME ZONE
    'UTC') as end_time_utc, MAX(d.startup_time_tz
    AT TIME ZONE 'UTC') as startup_time_utc,
    MAX(s.startup_time) AS startup_time
FROM sys.awr_pdb_snapshot s,
sys.awr_pdb_database_instance d WHERE
s.dbid =
SYS_CONTEXT('USERENV', 'DBID')
    AND s.instance_number =
    USERENV(' INSTANCE') AND
    d.dbid =
    SYS_CONTEXT('USERENV', 'DB
    ID')
    AND d.instance_number =
    USERENV('INSTANCE') AND
    s.startup_time =
    d.startup_time
)
,begin_snap AS
(SELECT NVL(s.snap_id, 0) as snap_id,
    NVL(s.END_INTERVAL_TIME_TZ AT TIME ZONE 'UTC',
e.startup_time_utc) as end_time_utc FROM
    sys.awr_pdb_snapshot s, end_snap e
WHERE s.dbid(+) = SYS_CONTEXT('USERENV', 'DBID')
    AND s.instance_number(+) =
    USERENV('INSTANCE') AND
    s.snap_id(+) = e. snap_id-1
    AND s.startup_time(+) = e.startup_time
)
,snaps AS
(SELECT b.snap_id as
    begin_snap_id,
    e.snap_id as
    end_snap_id,
    b.end_time_utc as
    begin_time_utc,
    e.end_time_utc as
    end_time_utc,
    (CAST(e.end_time_utc AS DATE) - CAST(b.end_time_utc AS
DATE) ) * 86400 as snap_interval_secs FROM begin_snap b,
end_snap e
)

SELECT begin_snap_id as bid, end_snap_id as eid,
    TO_CHAR (begin_time_utc, 'YYYY/MM/DD
    HH24:MI:SS') as begin_time_utc,
    TO_CHAR(end_time_utc, 'YYYY/MM/DD HH24:
    MI:SS')
    as end_time_utc, trunc(snap_interval_secs,2) as
    snap_interval_secs
FROM snaps
```

The above example SQL query is composed of an outer query, shown in bold at the bottom, and three inner queries shown above the outer query. The inner queries discover a current performance snapshot and its previous snapshot, and the outer query provides identifiers of both snapshots. Each snapshot may be queried to retrieve metrics that, although stored in database server 100, were originally recorded from telemetry of any of the many infrastructure layers of the implementation stack discussed earlier herein. Comparison of two performance snapshots may reveal a trend of performance degradation that may benefit from level two automatic diagnosis as follows.

1.7 Level Two Performance Metrics

In contrast to level one performance metrics, level two performance metrics are scalar measurements that provide more specific information about a database component that may be finer grained than (e.g. contained in or used by) a pluggable database. Either due to their numerosity or individual latencies and, unlike level one metrics, combined latencies of all level two metrics are too much to always collect and/or too much to collect from every pluggable database in container database 110. For example, level two performance metrics 150 may be automatically collected by database server 100 only in response to database server 100 detecting a performance degradation by analysis of level one metrics A-B.

In the shown embodiment, performance metrics 150 are temporarily collected to diagnose an already detected performance degradation. Although performance metrics 150 are not recorded in automatic workload repository 140, performance metrics 150 may be calculated from other database performance content such as Oracle dynamic performance views such as V$SESSION_WAIT and V$SESSION. Performance metrics 150 may be used to diagnose the problem and, for example, may be discarded more or less immediately after that use or may be retained, such as in Oracle dynamic performance views, for other purposes such as alerting the current problem or reuse for later diagnosing a future problem.

1.8 Root Cause Analytics

In the shown example, database server 100 uses level two performance metrics 150 to detect that the performance degradation of pluggable database 121 is caused by (e.g. contentious) resource demand from other pluggable database 122 as revealed by analysis of performance metric C that characterizes the performance of pluggable database 122. Performance metrics 150 may contain performance metric C and, as shown, other performance metrics that characterize multiple pluggable databases 121-122 that contend for a same resource. For example, level one metrics may reveal that too many threads are waiting for software locks and may or may not reveal which lock is problematic. Level two metrics may reveal which lock is involved and, for example, which database sessions or pluggable databases are contending for that lock. Analysis of performance metric C may reveal that pluggable database 122 is monopolizing the lock, which is causing the detected performance degradation of other pluggable database 121.

In other words, pluggable database 122 accidentally interferes with pluggable database 121, which means that pluggable databases 121-122 are somewhat incompatible within the confines of container database 110 in its current state. For example, pluggable databases 121-122 might not be incompatible if container database 110 had more capacity (i.e. resources to share) or had fewer other pluggable databases to divide those resources between. For example, container database 110 may contain tens of pluggable databases. Likewise, pluggable databases 121-122 would not be incompatible if they resided in separate container databases. Thus, transitory and incidental incompatibility of pluggable databases 121-122 may be conditioned on a demand spike of occupancy or activity in container database 110. In other words, incompatibility is not caused by mere colocation of pluggable databases 121-122 in container database 110, and incompatibility might not arise until after healthy colocation has lasted hours or days or weeks. Those are additional reasons that database server 100 might be unable to diagnose a problem solely from level one performance metrics.

Herein, root cause analysis is based on level two metrics. However, root cause analysis might reveal only an internal identifier such as a serial number, object identifier, or primary key into an internal system table or view. An internal identifier from root cause analysis may be more or less unintelligible to personnel who might adjust container database 110 to remedy the detected problem. Herein, level three metrics (not shown) dynamically provided by components 100 and 110 may provide sufficient information for personnel to understand and remedy the problem. For example, level three metrics may expressly identify, by name and by type, a database tenant, a pluggable database, or a database object such as a lock, session, or table.

1.9 Alerting and Event Processing

Database server 100 may generate alert 160 that contains the name and value of any or all of performance metric C and level three metrics. In other words, alert 160 contains sufficient details to convey what aspect of pluggable database 122 is causing a performance degradation (e.g. of pluggable database 121) in container database 110. Alert 160 may be implemented as a log entry in a log file, a row in a database system table, a trouble ticket for escalation, and/or an interactive alert such as an email or a popup window.

An embodiment may generate alert 160 as a system event in database server 100. Discussed earlier herein are various Oracle dynamic performance views, including those that contain a column that contains an event identifier such as views V$SESSION, V$SESSION_WAIT, V$SESSION_EVENT, and V$SYSTEM_EVENT. Any of those views may integrate with any event driven component by defining a database trigger or by the event driven component polling the view. Database server 100 may or may not support event handlers such as with an event queue or a publish-subscribe topic.

1.10 Example SQL Query for Level Two Performance Metrics

Oracle has various kinds of events, including wait events such as "db file sequential read", "log file sync", and "buffer busy waits". Oracle events may, in an embodiment, provide values for some level one performance metrics. For example, the value of performance metric A may be updated based on each log file sync event that occurs. The following is an example SQL OLAP query that analyzes level one performance metrics in an AWR snapshot to count how many times waiting occurred and total duration of waits for a particular pluggable database, and the ORDER BY clause aggregates by kind of event.

```
WITH
    dbtime AS (
        SELECT pdbs.con_id, pdbs.dbid, pdbs.name,
            (e.value -
```

```
        NVL(b.value, 0))/1000000 AS
        dbtime_secs FROM v$containers
        pdbs,
            (SELECT DISTINCT stat_id FROM v$sys_time_model WHERE stat_name =
            'DB time') sn, sys.wrh$_con_sys_time_model e,
            sys.wrh$_con_sys_time_model b
        WHERE pdbs.con_id > 1
            AND NOT pdbs.name IN
            ('PDB$SEED', 'PAASSEED')
            AND e.dbid =
            SYS_CONTEXT ('USERENV', 'DBI
            D')
            AND e.instance_number =
            USERENV ('INSTANCE') AND
            e.snap_id = {EID}
            AND
            e.stat_id =
            sn.stat_id
            AND
            e.con_dbid =
            pdbs.dbid
            AND b.dbid(+) = SYS_CONTEXT('USERENV', 'DBID')
            AND b.instance_number(+) =
            USERENV('INSTANCE') AND
            b.snap_id(+) = {BID}
            AND
            b.stat_id(+) =
            sn.stat_id AND
            b.con_dbid(+) =
            pdbs.dbid
    ),
    events AS (
        SELECT e.con_dbid as dbid, en.name as event_name,
            en.wait_class, (e.TIME_WAITED_MICRO_FG -
            NVL(b.TIME_WAITED_MICRO_FG, 0) )/1000000 AS
            fg_time_in_secs, e.TOTAL_WAITS_FG -
            NVL(b.TOTAL_WAITS_FG, 0) as fg_wait_count,
            e.TOTAL_TIMEOUTS_FG - NVL(b.TOTAL_TIMEOUTS_FG, 0) as fg_timeouts
        FROM sys.wrh$_con_system_event_e,
        sys.wrh$_con_system_event_b, v$event_name en WHERE
            e.dbid = SYS_CONTEXT ('USERENV', 'DBID')
            AND e.instance_number =
            USERENV ('INSTANCE') AND
            e.snap_id = {EID}
            AND
            e.event_id =
            en.event_id
            AND
            en.wait_clas
            s <> 'Idle'
            AND b.dbid(+) = SYS_CONTEXT ('USERENV', 'DBID')
            AND b.instance_number(+) =
            USERENV('INSTANCE') AND
            b.snap_id(+) = {BID}
            AND
            b.event_id(+)
            = e.event_id
            AND
            b.con_dbid(+) =
            e.con_dbid
    )
SELECT dbtime.con_id,
        dbtime.name as
        pdb_name,
        events.event_name,
        events.fg_wait_count as
        total_waits,
        events.fg_timeouts as
        total_timeouts,
        events.fg_time_in_secs as
        total_wait_time_s,
        events.fg_time_in_secs * 1000 / (GREATEST(1, events.fg_wait_count) )
        as avg_latency_ms, dbtime.dbtime_secs as total_db_time_s,
        events.fg_time_in_secs * 100 / dbtime.dbtime_secs AS perc_dbtime,
        events.fg_time_in_secs / (GREATEST(1, {SNAP_INTERVAL_SECS} ) ) as
        average_active_sessions, '{BEGIN_TIME_UTC}' as begintime,
        '{END_TIME_UTC}' as
        endtime,
        events.wait_class
```

```
FROM dbtime, events
WHERE dbtime.dbid = events.dbid
  AND events.fg_time_in_secs >=
  dbtime.dbtime_secs * (2 / 100) AND
  dbtime.dbtime_secs > 0
ORDER BY dbtime.con_id, events.wait_class, events.event_name
```

1.11 Event Generation and Remedy Suggestion

As discussed above, approaches herein may both react to events (i.e. that contribute to level one performance metrics) and generate new events (i.e. alert 160). In any case, Oracle exposes events only as rows in system views and does not provide a queue or stream of events. Thus, a preferred Oracle embodiment herein does not directly react to events but may nonetheless emit alert 160 as an event.

In the shown embodiment, alert 160 contains recommended adjustment 170 that is an automatically generated suggestion of a likely corrective action that personnel may perform at their discretion. For example for upscaling, recommended adjustment 170 may contain processor count 181 that may be a total or additional amount of central processing unit (CPU) cores to allocate to a particular one of databases 110 and 121-122, which may or may not require moving pluggable database(s) out of container database 110 to a different container database. Recommended adjustment 170 may contain session identifier 182 that may, for example, indicate a malfunctioning or resource monopolizing database session that personnel may or may not terminate at their discretion.

2.0 Performance Diagnositic and Remediation Process

Figure 2:
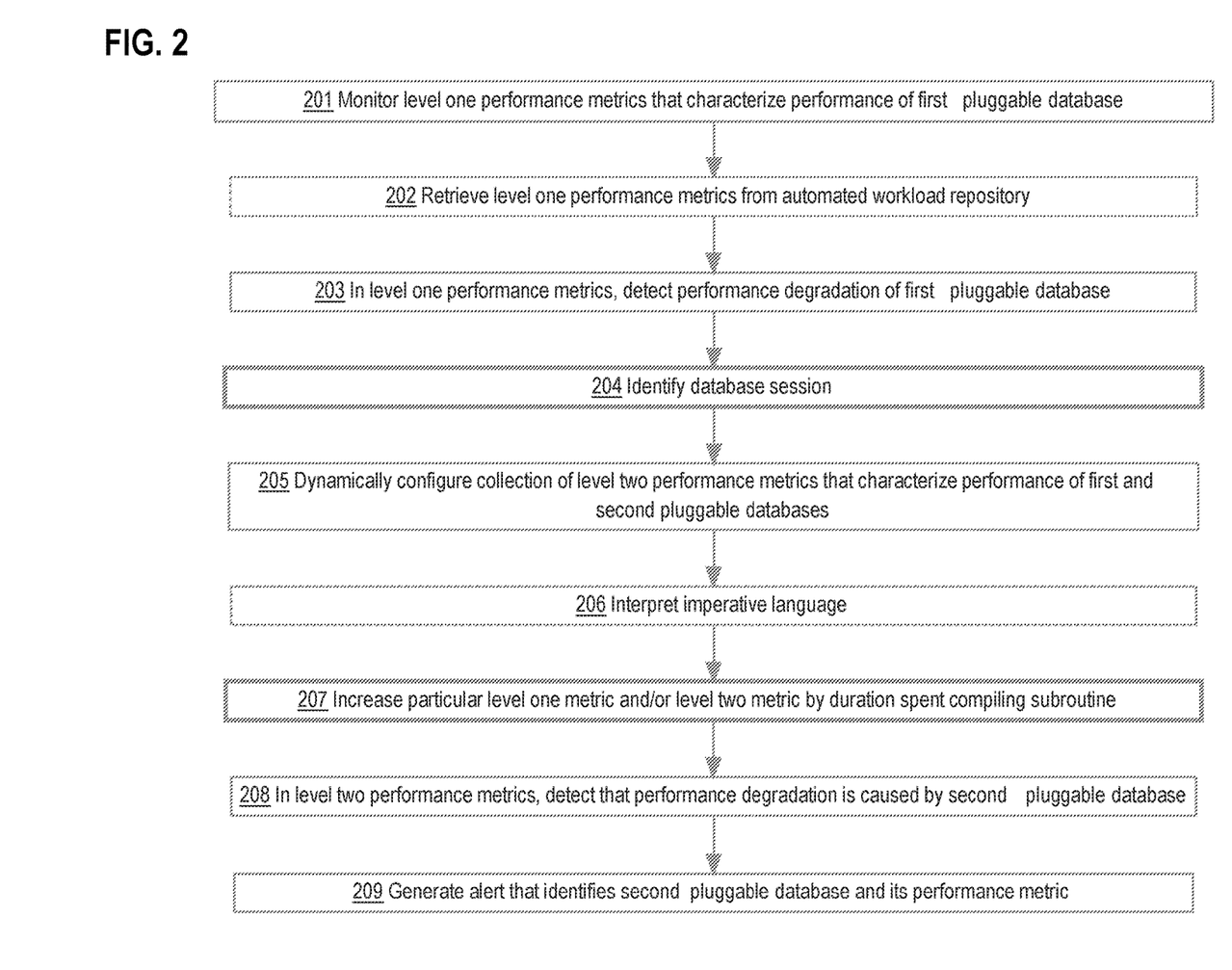
FIG. 2 is a flow diagram that depicts an example computer process that a database server performs to preserve quality of service in a multitenant container database by using hierarchical and non-intrusive techniques to detect and diagnose incidental contention between database tenants.

FIG. 2 is a flow diagram that depicts hierarchal performance monitoring (HPM) as an example computer process that database server 100 may perform to preserve quality of service in multitenant container database 110 by using hierarchical and non-intrusive techniques to detect and diagnose incidental contention between database tenants 131-132. FIG. 2 is discussed with reference to FIG. 1.

The entire process of FIG. 2 autonomously occurs in the background, such as periodically (e.g. scheduled). For example, the process of FIG. 2 may occur regardless of whether or not database tenants 131-132 are currently connected to their pluggable databases 121-122.

As discussed earlier herein, collection and recordation of level one performance metrics A-B may occur continuously or with a same or greater frequency than occurrences of the process of FIG. 2. The process of FIG. 2 may presume that level one performance metrics A-B are sufficiently recent and that expired portions of level one timeseries are already excluded (e.g. deleted). In various embodiments discussed earlier herein, level one performance metrics A-B are recorded into a relational table or view in automatic workload repository 140, such as into Oracle's SYS.AWR_PDB_SNAPSHOT, SYS.WRH, V$CONTAINERS, V$RSRC_PDB_METRIC, V$PROCESS, or V$SESSION.

In the process of FIG. 2, pluggable database 121 provides a demonstrative example. However, the process of FIG. 2 may occur for all pluggable databases in all container databases that database server 100 hosts and, as discussed elsewhere herein, some individual metrics may reflect multiple pluggable databases in some of the following steps. Although the process of FIG. 2 demonstrates a particular scenario a performance degradation caused by collocation of two pluggable databases of two database tenants, this process also encompasses numerosity of databases or tenants.

In other examples, occurrence of collocation interference needs more than two pluggable database or more than two database clients. In another example, pluggable databases of a single database tenant are sufficient for collocation interference. In other example, the performance degradation is not collocation interference, and a pluggable database may by itself cause or experience a computer capacity constraint or have a suboptimal configuration that can directly benefit from several of the following steps.

Step 201 monitors level one performance metrics that characterize performance of at least pluggable database 121 as discussed earlier herein. Steps 202 and 206 are shown with dashed outlines to indicate that steps 202 and 206 may be unimplemented (i.e. not performed) except in special embodiments as discussed below.

In an embodiment, step 202 is implemented and retrieves level one performance metrics A-B from automatic workload repository 140. Step 202 may be a sub-step of monitoring step 201. Step 202 may use structured query language (SQL) or online analytical processing (OLAP) that joins multiple different database tables and/or views in automatic workload repository 140, such as the Oracle implementations listed above, filters, sorts, vertically (i.e. projects) and/or horizontally (i.e. limits) intermediate results, and/or aggregates (e.g. rolls up) measurements such as by summing, averaging, or discovering a maximum.

Some or all of the Oracle tables and views in automatic workload repository 140 listed above may contain already rolled up statistics that are aggregate measurements such as a sum, average, or maximum. In some scenarios, a level one performance metric is already rolled up, and level two performance metric(s) in performance metrics 150 are needed to effectively disaggregate (i.e. drill down) to measurements of a fine grained object that is shared, such as a lock or system table, or not shared, such as a database session or connection. For example as shown in FIG. 1, performance metric C is not based on a database object that is shared with pluggable database 121.

By streamlined or complicated analysis of level one performance metrics A-B, step 203 detects a performance degradation of pluggable database 121. All of subsequent steps 204-208 are in reaction to detection of the performance degradation. Steps 204 and 207 are shown with bold outlines to indicate that steps 204 and 207 are optional and are skipped (i.e. not performed) except in special scenarios as discussed below.

None, some, or all of the ongoing database sessions of some or all of database tenants 131-132 may experience the detected performance degradation. In a scenario having a database session that experiences the detected performance degradation, step 204 occurs that identifies the database session. For example, step 204 may identify an impacted database session in pluggable database 121 from database tenant 131, which does not mean that pluggable database 121 is causing the performance degradation, which is why level two performance metrics may be needed.

Step 205 dynamically configures collection of level two performance metrics 150 that characterize performance of multiple pluggable databases 121-122 together and individually. For example, many pluggable databases 121-122 may contend for a shared resource, but only one or very few of the many pluggable databases 121-122 might be monopolizing the shared resource. Temporarily and selectively for particular components and database objects, step 205 activates collection of level two performance metrics 150 whose collection is otherwise categorically disabled by default to avoid excessive overhead.

In an embodiment, step 206 is implemented and may be a sub-step of any or each of steps 205 and 207-209. Step 206 interprets an imperative language for collecting or processing level two performance metrics 150. SQL is not an imperative language. Compilation is not interpretation. For example, sub-step 206 may interpret python script(s) that were handcrafted by a domain expert to collect, analyze, or otherwise process some or all level two performance metrics 150. For example, database server 100 may contain a high level language (HLL) interpreter, and an HLL script invoked by step 206 may, for example, use SQL query(s) to access and analyze Oracle dynamic performance views such as V$SESSION_WAIT and V$SESSION. Such a SQL query may contain, as foreign or primary keys for joining or selection or as values for filtration, values from level one performance metrics A-B. Thus, step 206 can drill down as discussed above.

Levels one and two performance metrics may include measured latencies (i.e. durations) that may be aggregate (i.e. rolled up) latencies such as a sum, average, or maximum. During collection of levels one and two performance metrics, measured latencies may fluctuate (e.g. grow, i.e. monotonically increase by summation). Detection of the performance degradation by earlier step 203 may entail a level one performance metric that is a (e.g. aggregate) latency. In one scenario, level one performance metric A indicates that an individual or aggregate latency occurred, and the measured latency may exceed a predefined latency threshold as detected by step 203. In another scenario that does not entail a latency, session waiting count B may exceed a predefined numerosity threshold as detected by step 203.

In a scenario where step 203 detected excessive latency in level one performance metric A, step 207 occurs that increases performance metric A and/or a level two latency metric that aggregates or disaggregates (i.e. rolls up or drills down) the latency differently. For example, a definition of any database object (e.g. table, column, view, index, user defined function (UDF) or stored procedure, or user defined type) may be stored in a database dictionary as discussed elsewhere herein. If the database object is a system object, then its definition may be shared by multiple pluggable databases 121-122 of multiple database tenants 131-132.

Reads and writes to a shared definition of a system object may implicitly be somewhat serialized for integrity. For example, even though use of a system object by either of database tenants 131-132 may be restricted as read only, the system itself (e.g. any of components 100, 110, and the root database) may modify (i.e. alter or revise) the definition of a system object such as a shared stored procedure. While database server 100 compiles source logic from the revised definition of the stored procedure, even readers of the revised definition, such as invokers of the revised stored procedure such as database sessions of database tenants 131-132, should wait (e.g. be suspended) until compilation finishes. Each individual wait by each individual reader (e.g. database session or execution thread) may cause summation step 207 to occur. An unshown example of summation may instead not entail latency, such as when level one or two performance metric B or C is tallied by repeated incrementation. For example, step 207 may monotonically increase sessions waiting count B.

In level two performance metrics 150, step 208 detects that the performance degradation of any of components 100, 110, or 121 is caused by other pluggable database 122. For example, step 208 may detect that performance metric C of pluggable database 122 has an abnormal (i.e. out of normal operating range) value. Either of detection steps 203 and 208 may use a predefined threshold or a moving threshold such as based on a trend such as when the performance metric has a timeseries of history.

As discussed earlier herein, step 209 generates alert 160 that identifies other pluggable database 122 as a root cause and identifies or contains performance metric C of pluggable database 122. The process of FIG. 2, from performance degradation detection to detailed alert generation, is faster and more reliable than other expert diagnostic approaches. Alert 160, with or without containing recommended adjustment 170, enables personnel to remedy the root cause, as identified in alert 160, in less time than with other expert diagnostic approaches. Thus, the detected performance degradation can be eliminated faster and the performance of database server 100 increased (i.e. back to normal) sooner. In that way, the process of FIG. 2 increases the speed, throughput, and reliability of database server 100 and improves (i.e. decreases) the latency of database server 100. The performance of database server 100 is improved by the process of FIG. 2.

3.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

4.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
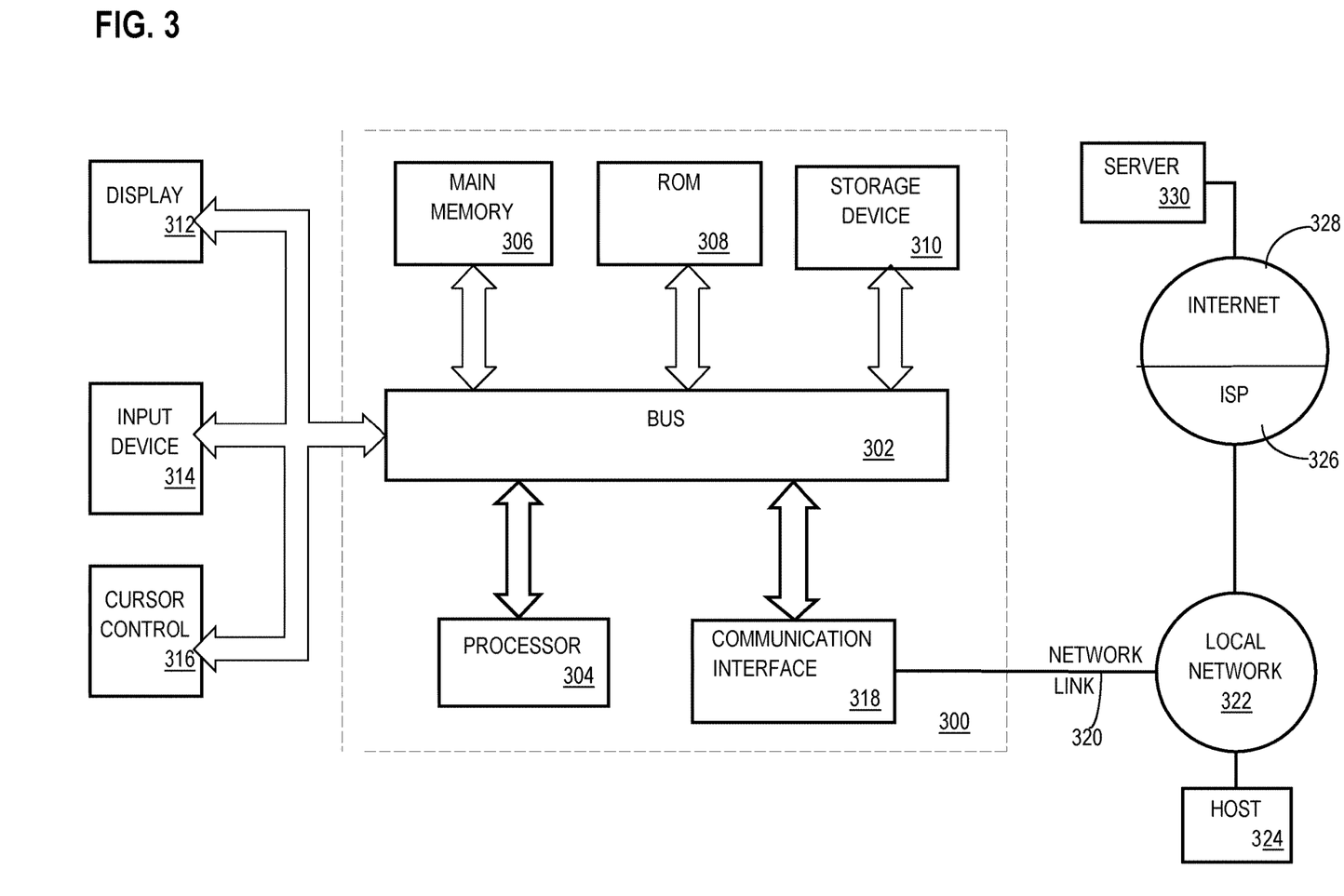
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
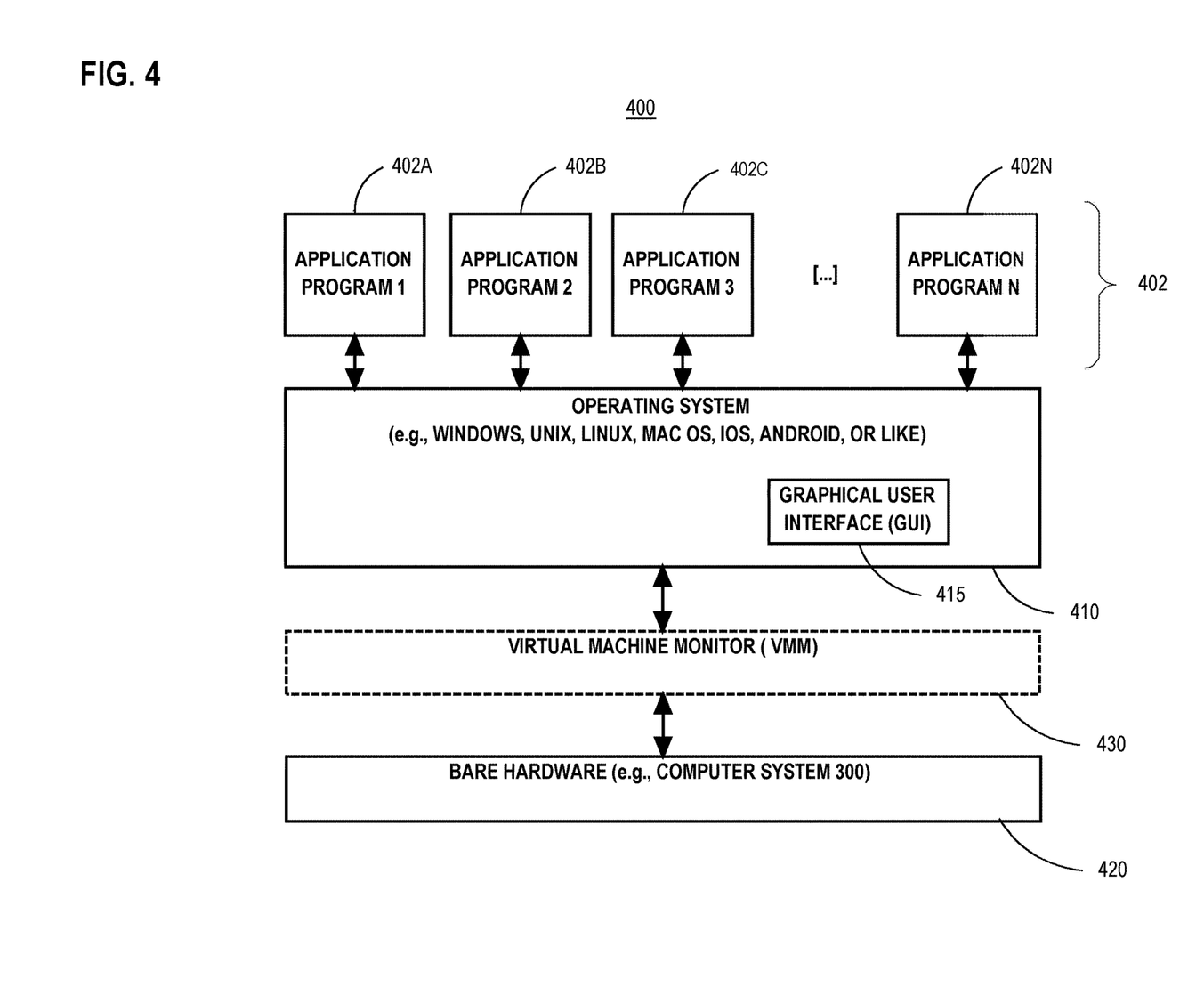
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
monitoring, by a database server that operates a container database, a first plurality of performance metrics that characterize the performance of at least a first pluggable database in the container database;
detecting, by the database server, in the first plurality of performance metrics that characterize the performance of at least the first pluggable database, a performance degradation of the first pluggable database;
dynamically configuring, by the database server in response to said detecting the performance degradation of the first pluggable database, collection of a second plurality of performance metrics that characterize the performance of at least the first pluggable database and a second pluggable database in the container database;
detecting, by the database server, in the second plurality of performance metrics that characterize the performance of at least the first pluggable database and the second pluggable database, that the performance degradation is caused by the second pluggable database in the container database; and
generating, by the database server, an alert that identifies the second pluggable database, wherein:
the alert contains a particular metric of the second plurality of performance metrics, and
the particular metric characterizes the performance of the second pluggable database.

2. The method of claim 1 wherein at least one selected from a group consisting of:
each of the first pluggable database and the second pluggable database is associated with a respective distinct database tenant, and
the first pluggable database and the second pluggable database are not operated by a same client program.

3. The method of claim 1 wherein said detecting the performance degradation of the first pluggable database comprises using a hashed identifier to invoke a relational query that retrieves the first plurality of performance metrics from a database view or a database table.

4. The method of claim 3 wherein the first pluggable database and the second pluggable database do not contain said database table.

5. The method of claim 1 further comprising increasing the particular metric by a duration spent compiling a subroutine.

6. The method of claim 1 wherein the alert contains a recommended adjustment to at least one selected from a group consisting of the first pluggable database and the second pluggable database.

7. The method of claim 6 wherein the recommended adjustment specifies at least one selected from a group consisting of a count of processors and an identifier of a database session to terminate.

8. The method of claim 1 further comprising in response to said detecting the performance degradation of the first pluggable database, automatically identifying a database session.

9. The method of claim 1 wherein the first plurality of performance metrics comprises a count of waiting database sessions.

10. The method of claim 1 wherein:
a particular step comprises the database server interpreting an imperative language;
the particular step is at least one selected from a group consisting of:
said generating the alert,
said detecting that the performance degradation is caused by the second pluggable database, and
said dynamically configuring said collection of the second plurality of performance metrics.

11. The method of claim 1 wherein the first plurality of performance metrics comprises an aggregation statistic that collectively characterizes the performance of at least the first pluggable database and the second pluggable database.

12. One or more non-transitory computer-readable media storing instructions that, when executed by one or more processors, cause:
monitoring, by a database server that operates a container database, a first plurality of performance metrics that characterize the performance of at least a first pluggable database in the container database;
detecting, by the database server, in the first plurality of performance metrics that characterize the performance of at least the first pluggable database, a performance degradation of the first pluggable database;
dynamically configuring, by the database server in response to said detecting the performance degradation of the first pluggable database, collection of a second plurality of performance metrics that characterize the performance of at least the first pluggable database and a second pluggable database in the container database;
detecting, by the database server, in the second plurality of performance metrics that characterize the performance of at least the first pluggable database and the second pluggable database, that the performance degradation is caused by the second pluggable database in the container database; and
generating, by the database server, an alert that identifies the second pluggable database, wherein:

the alert contains a particular metric of the second plurality of performance metrics, and the particular metric characterizes the performance of the second pluggable database.

13. The one or more non-transitory computer-readable media of claim 12 wherein said detecting the performance degradation of the first pluggable database comprises retrieving the first plurality of performance metrics from a database table.

14. The one or more non-transitory computer-readable media of claim 13 wherein the first pluggable database and the second pluggable database do not contain said database table.

15. The one or more non-transitory computer-readable media of claim 12 wherein the instructions further cause increasing the particular metric by a duration spent compiling a subroutine.

16. The one or more non-transitory computer-readable media of claim 12 wherein the alert contains a recommended adjustment to at least one selected from a group consisting of the first pluggable database and the second pluggable database.

17. The one or more non-transitory computer-readable media of claim 16 wherein the recommended adjustment specifies at least one selected from a group consisting of a count of processors and an identifier of a database session to terminate.

18. The one or more non-transitory computer-readable media of claim 12 wherein the instructions further cause in response to said detecting the performance degradation of the first pluggable database, automatically identifying a database session.

19. The one or more non-transitory computer-readable media of claim 12 wherein the first plurality of performance metrics comprises a count of waiting database sessions.

20. The one or more non-transitory computer-readable media of claim 12 wherein:

a particular step comprises the database server interpreting an imperative language;

the particular step is at least one selected from a group consisting of:

said generating the alert, said detecting that the performance degradation is caused by the second pluggable database, and said dynamically configuring said collection of the second plurality of performance metrics.

\* \* \* \* \*